United States Patent [19]
Cox et al.

[11] Patent Number: 5,654,055
[45] Date of Patent: Aug. 5, 1997

[54] MASKING TAPE WITH STIFFENED EDGE

[75] Inventors: Sheila F. Cox, Maplewood; Daryl D. Johnson, Lake Elmo; Sidney Magee, Jr.; Steven J. Perron, both of St. Paul, all of Minn.

[73] Assignee: Minesota Mining and Manufacturing Company, St. Paul, Minn.

[21] Appl. No.: 467,233

[22] Filed: Jun. 6, 1995

Related U.S. Application Data

[63] Continuation of Ser. No. 314,536, Sep. 28, 1994, Pat. No. 5,421,936, which is a continuation-in-part of Ser. No. 207,305, Mar. 7, 1994, abandoned, which is a division of Ser. No. 24,607, Mar. 1, 1993, Pat. No. 5,354,614.

[51] Int. Cl.$^6$ ............................ C09J 7/02; B05D 1/32; B32B 3/04
[52] U.S. Cl. .................. 428/41.7; 118/504; 118/505; 428/124; 428/192; 428/195; 428/202; 428/343; 428/354
[58] Field of Search ........................ 118/504, 505; 428/40, 124, 192, 195, 343, 202, 354

[56] References Cited

U.S. PATENT DOCUMENTS

| | | |
|---|---|---|
| 2,210,233 | 8/1940 | De Lillo. |
| 2,590,557 | 3/1952 | Melsheimer. |
| 3,091,218 | 5/1963 | Wilson et al.. |
| 3,565,038 | 2/1971 | Van Berriger. |
| 3,633,542 | 1/1972 | Read et al.. |
| 3,930,069 | 12/1975 | Stephens. |
| 3,935,758 | 2/1976 | Polzin et al.. |
| 4,033,803 | 7/1977 | Coder. |

(List continued on next page.)

FOREIGN PATENT DOCUMENTS

| | | |
|---|---|---|
| 1042283 | 11/1978 | Canada. |
| 0 365 510 | 4/1990 | European Pat. Off.. |
| 0 518 403 | 12/1992 | European Pat. Off.. |
| 2116964 | 7/1972 | France. |
| 86 07 368 | 4/1986 | Germany. |
| 91 06 206.3 | 8/1991 | Germany. |
| 93 02 930.6 | 6/1993 | Germany. |
| 47-18930 | 9/1972 | Japan. |
| 63-183978 | 7/1988 | Japan. |
| 79-5866 | 11/1979 | South Africa. |
| 1 555 808 | 11/1979 | United Kingdom. |
| WO92/20461 | 11/1992 | WIPO. |

OTHER PUBLICATIONS

Product Packaging—Wielander+Schill—"Einziehfix".
3M Brochure—60-4400-0845-0(5612)BE—"Scotch Brand Feather Edge Masking Tape".
Tru-Mask Brochure—"Follex System".

*Primary Examiner*—James C. Cannon
*Attorney, Agent, or Firm*—Gary L. Griswold; Walter N. Kirn; Charles D. Levine

[57] ABSTRACT

A masking tape is provided that is suitable for insertion under many moldings and gaskets which not only masks the molding or gasket but also facilitates refinishing under at least a portion of the molding or gasket. The masking tape is constructed to include a longitudinal non-adhesive portion and a longitudinal adhesive portion, wherein the non-adhesive portion is stiffer than the adhesive portion and is sufficiently stiff to facilitate easy insertion of the non-adhesive portion beneath at least a portion of the molding or gasket to be masked while the adhesive portion is sufficiently flexible to permit the wrapping thereof around the molding or gasket. The stiffened portion advantageously provides a dual purpose of facilitating the easy insertion of the non-adhesive portion beneath the molding or gasket and creating a lever action during application between the molding or gasket and the wall or panel to which the molding or gasket is mounted. This lever action creates a force which tends to separate or lift an edge of the molding or gasket from the wall or panel to open the wall or panel under the molding or gasket for refinishing. The masking tape is especially applicable for masking flexible gaskets that include a leg portion that overlies an adjacent panel that is to be refinished.

10 Claims, 2 Drawing Sheets

U.S. PATENT DOCUMENTS

| | | |
|---|---|---|
| 4,201,799 | 5/1980 | Stephens . |
| 4,263,355 | 4/1981 | Sarkisian . |
| 4,341,828 | 7/1982 | Stephens . |
| 4,398,495 | 8/1983 | Harris, Jr. et al. . |
| 4,576,674 | 3/1986 | Le Torte ................................ 156/463 |
| 4,789,579 | 12/1988 | Tutas et al. . |
| 5,049,445 | 9/1991 | Arvidsson et al. . |
| 5,128,176 | 7/1992 | Schmidt . |
| 5,354,614 | 10/1994 | Cox et al. ................................ 428/343 |
| 5,421,936 | 6/1995 | Cox et al. . |

MASKING TAPE WITH STIFFENED EDGE

This is a continuation of U.S. application Ser. No. 08/314,536 filed on Sep. 28, 1994(now U.S. Pat. No. 5,421,936), which is a continuation of U.S. application Ser. No. 08/207,305 filed on Mar. 7, 1994(now abandoned), which is a division of U.S. application Ser. No. 08/024,607 filed on Mar. 1, 1993, now issued as U.S. Pat. No. 5,354,614.

TECHNICAL FIELD

The present invention relates to a masking tape for use during preparation, sanding, painting and the like refinishing operations for masking areas not to be refinished such as moldings or gaskets provided along a panel. Such a panel may be provided as a part of a vehicle body, boats, airplanes, house trailers, or walls of buildings or other structures. More particularly, the present invention relates to a tape structure for use in masking such moldings, gaskets and the like which effectively protects the area to be masked while permitting refinishing of the area immediately adjacent thereto and preferably at least partially underneath the masked object.

BACKGROUND OF THE INVENTION

Masking tapes are commonly used in refinish painting operations. Such operations include painting or sealing a surface, as well as sanding or otherwise preparing the surface for painting. The term painting as used throughout this specification is meant to include the application of paints by spraying or other application by brushes, rollers, etc. and other similar treatments including the application of any substance to a surface of which part of the surface is to be treated while a part is masked from the treatment. The term refinishing is meant to include the painting, sanding, or otherwise preparing of any surface of which a portion requires painting. Typically, this means a surface which has been previously painted.

Refinishing operations are very often conducted on walls, vehicles bodies and the like which may include moldings or gaskets that must be masked off before painting. It is highly desirable to effectively mask such molding or gasket, but to ensure complete refinishing to the edge of and preferably even under the molding or gasket if possible. It is known to mask such moldings or gaskets with conventional paper masking tapes. However, simply masking along the edge of the molding or gasket does nothing to improve refinishing under the molding or gasket. The surface preparation and paint coverage extends only up to the edge of the masking material. Such coverage is not comparable to that which could be obtained if the molding or gasket were removed prior to the painting as an alternative. Moreover, paint tends to build up along the edge of the masking tape, either on the molding itself or on the panel, and after the tape is removed, a paint ridge is often left behind which is particularly susceptible to cracking or chipping.

It is thus desirable to prepare and get at least some paint coverage under at least a portion of the edge of the molding or gasket that is masked off. One method of taping and a tool for applying such a masking tape is disclosed in U.S. Pat. No. 3,935,758, granted Feb. 3, 1976 to Polzin et at. According to this disclosure, a typical masking tape is applied by the special tool so as to at least partially wrap around the edge and underneath of body side moldings on vehicle bodies. The problem with this approach is that even with a special tool, it is difficult to adhere the adhesive tape under any portion of a molding or the like that is attached to a panel. This problem is exasperated if the clearance between the molding and the body panel is minimal.

With regard to gaskets, specifically, as they are provided along vehicle body panels, it has been suggested to insert an elongate element under the gasket portion and on top of the body panel for lifting and keeping the gasket material away from the body panel at least over a portion of the extent that the gasket overlies the body panel. Such elongate element is inserted far enough under the gasket edge so that at least a portion of the body panel thereunder is exposed to be painted.

Many such insertion elements have been developed. Most notably, cords, cables, wires and other strips are presently available which are made for insertion under the overlapping portion of such a flexible gasket and to lay upon the body panel. Such cords, cables, wires and strips effectively lift the overlying portion of the gasket material from the body panel permitting refinishing partially underneath of the gasket; however, the gaskets themselves must be additionally masked. Moreover, a problem with such devices is that the paint builds up against the edge thereof and leaves a ridge after the device is removed. This ridge has proved to be susceptible to cracks and chips which may extend out from under the gasket.

One example of a plastic cable which is inserted under the edge of a gasket to lift it from a car body panel for refinishing is available from Tru-Mask Products, Inc. of Garfield, N.J. and is known as the Follex® System. Further examples of similar strings, wiring cords or enameled wires are described in the published Japanese Patent Application 47-18930, published September 1972.

Further in regard to the masking of flexible gaskets, yet another type of masking product has been developed which moves and masks a gasket in a single operation. Such a masking product is described in the published PCT Application EP/92/01021 to Ribic. The Ribic masking device comprises a strip of material divided longitudinally into two leg portions so that the strip makes a long claw or hook-like structure. The hook leg of the structure is non-adhesive and is provided to hook over the gasket or a portion thereof and the other leg is provided with adhesive for adhering the strip to the article to be masked off, such as a window. This product relies on the structural integrity of the device and the maintenance of the legs in their angled positions with respect to one another in order to work. In other words, the profile of the masking product must maintain a certain rigidity of its own in order to be able to provide its hooking function.

Another class of masking products that are specially designed for masking areas adjacent to areas to be painted, are those which are used for feathering or blending new paint with the old paint along the masked line. Typically, such a masking product comprises an adhesive tape having a longitudinal edge portion thereof which is non-adhesive. The masking tape is then applied adjacent to an area to be refinished with the non-adhesive portion closest to the area to be refinished. As the paint is sprayed along the feathering tape, the non-adhesive portion causes the new paint to be feathered or blended with the old along the surface underneath the non-adhesive portion. Such masking tapes and dispensers are disclosed in U.S. Pat. No. 4,341,828, granted Jul. 27, 1982 to Stephens, and U.S. Pat. No. 4,576,674, granted Mar. 18, 1986 to Le Tarte. The non-adhesive longitudinal edge can be provided by simply not coating that edge portion with adhesive during the manufacturing operation, or by rendering that portion non-adhesive by applying a strip of material over the adhesive along the edge of the tape. The latter may be performed by simply folding over a longitudinal edge of the tape onto itself on the adhesive side of a conventional masking tape.

SUMMARY OF THE INVENTION

The present invention overcomes the disadvantages and shortcomings associated with prior art masking tapes by providing a masking tape suitable for insertion under many moldings and gaskets which not only masks the molding or gasket but also facilitates refinishing under at least a portion of the molding or gasket.

In accordance with the present invention, a masking tape is constructed to include a longitudinal non-adhesive portion and a longitudinal adhesive portion, wherein the non-adhesive portion is stiffer than the adhesive portion and is sufficiently stiff to facilitate easy insertion of the non-adhesive portion beneath at least a portion of the molding or gasket to be masked, while the adhesive portion is sufficiently flexible to permit the wrapping thereof around the molding or gasket.

The stiffened portion advantageously provides the dual purpose of facilitating the easy insertion of the non-adhesive portion beneath the molding or gasket and creating a lever action during application between the molding or gasket and the wall or panel to which the molding or gasket is mounted. This lever action creates a force which tends to separate or lift an edge of the molding or gasket from the wall or panel to open the wall or panel under the molding or gasket for refinishing.

Further in accordance with the present invention, the masking tape is especially applicable for masking flexible gaskets that include a leg portion that overlies an adjacent panel that is to be refinished. The non-adhesive stiffened portion is insertable beneath the gasket leg along the length of the gasket to be masked. Thereafter, the more flexible adhesive portion of the masking tape is wrapped around the gasket and adhered to the gasket and next adjacent substrate, if so constructed. During the adhering step, the person applying the masking tape pulls on the opposite edge of the masking tape so as to cause the lever action of the stiffening strip against the panel and the gasket leg. The gasket leg is thus lifted from the panel and then held in this lifted condition by the adhesive portion. The stiffening strip must be sufficiently stiff in the transverse direction of the masking tape to not only cause the lever action but also to maintain itself in a substantially linear disposition in the transverse direction of the masking tape for an indefinite length of time. Moreover, during this indefinite length of time, the masking tape should be able to endure certain changes in ambient conditions. In the case of refinishing of a vehicle body panel, the panel and masking tape are often subjected to abrasive agents, chemical solvents and raised temperatures in the range of 120°–180° F. (49°–82° C.) for baking the paint on the panel. The masking tape must be able to withstand such environments for that particular application. The present invention also relates to the method of using the masking tape in the manner of lifting and holding a gasket leg during a refinishing operation.

DETAILED DESCRIPTION OF THE PREFERRED EMBODIMENTS

Figure 1:
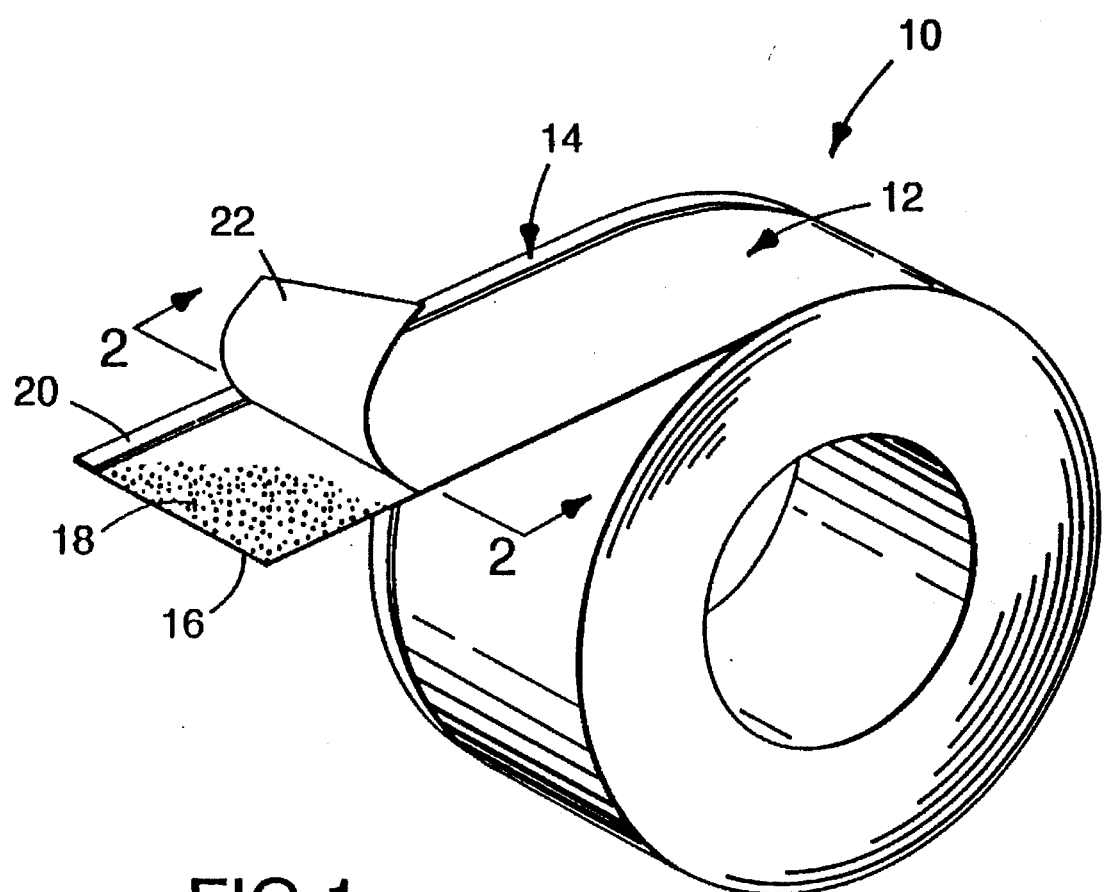
FIG. 1 is a perspective view of a masking tape structure in accordance with the present invention illustrated in roll form.
Figure 2:
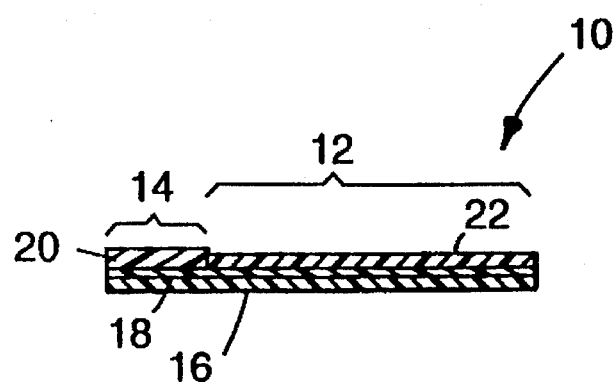
FIG. 2 is a cross-sectional view of a tape structure in accordance with the present invention taken along line 2—2 in FIG. 1.

With reference to the drawings, wherein like numerals are used to designate like components throughout the several Figures, and initially to FIGS. 1 and 2, a masking tape 10 is illustrated in roll form. In general, the tape 10 is longitudinally divided into an adhesive portion 12 and a non-adhesive portion 14. The adhesive portion 12 preferably comprises a majority of the width of the tape 10 so as to ensure adequate adhesive for securing the masking tape 10 to an article to be masked, and to hold even against any additional bias that may be generated by the particular application such as will be more fully understood from the description of some particular applications below. The width of the non-adhesive portion 14 is also largely dependent on the particular application of the masking tape 10. More particularly, the width of the non-adhesive portion 14 depends on the degree to which the non-adhesive portion 14 is to be inserted under a molding, gasket or the like, and whether it is to act against the molding, gasket or other. Again, this action will be more fully understood from the description of the particular applications below. In accordance with a preferred embodiment, for a 2 inch (5.08 cm) width tape, the non-adhesive portion comprises 0.375 inch (0.95 cm) of the width measured from one edge.

The basic structure of the masking tape 10 in accordance with the present invention includes a backing layer 16, an adhesive layer 18 provided on at least a portion of a major surface of the backing layer 16 and a stiffening means along the non-adhesive portion 14. In accordance with the preferred embodiment of the masking tape 10, the non-adhesive portion 14 is provided by covering an edge portion of the adhesive layer 16 with a stiffening strip 20 which also comprises the aforementioned stiffening means. Such a stiffening strip 20 may be of many different shapes and sizes, but is preferably uniform and provided with a rectangular cross-section as shown in FIG. 2. It is understood that the non-adhesive portion 14 could be provided by simply not coating that portion with adhesive. In that case, the stiffening means could be provided by coating a stiffening layer over that portion, or a strip of stiffening material could be attached thereto by other means, such as by thermal welding. Alternatively, the adhesive coated backing may fold over or wrap around the stiffening strip to create the non-adhesive portion. As yet another alternative, a folded over edge of backing material can comprise the stiffening strip while creating the non-adhesive portion.

The masking tape 10 may also comprise a liner 22 covering the adhesive portion 12, specifically the exposed portion of the adhesive layer 18, to protect the surface of the adhesive layer 18 when the masking tape 10 is in roll form. If a liner were not provided in the roll form, at least a portion of the surface of the adhesive layer 18 near the edge of the stiffening strip 20 would be exposed to air and may partially oxidize.

It is also noted that the adhesive layer 18 need not necessarily cover the entire major surface of the adhesive portion 12 of the masking tape 10. Adhesive free zones could be provided anywhere on the major surface of the backing layer 16 within the adhesive portion 12 in regular or irregular patterns or along a longitudinal line adjacent to or spaced from the stiffening strip 20. Again, the width of the adhesive portion 12 and the quantity, type and pattern of the adhesive layer 18 depends on the particular application.

Figure 3:
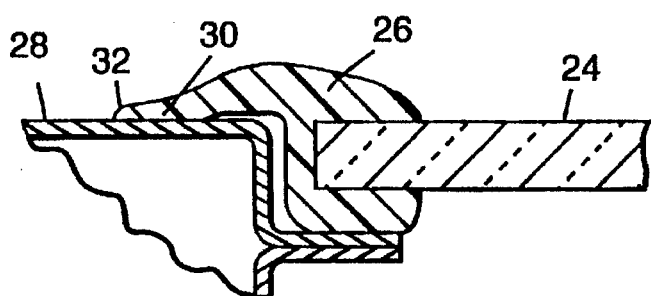
FIG. 3 is a cross-sectional view of a gasket between a body panel and window structure to which the masking tape of the present invention is particularly applicable.

One specific application for the masking tape 10 is in the masking of resilient gasket materials that adjoin panels to be refinished. An example of one type of such structure is illustrated in FIG. 3. Shown is a typical structure used in vehicle body, airplane, marine hull, house trailer and the like constructions where a window or windshield 24 is surrounded by a flexible gasket 26 to seal the window 24 to a body panel 28. The gasket 26 includes a resilient leg portion 30 that overlies a portion of the body panel 28 along the length of the window 24.

When refinishing such a body panel 28 it is desirable to not only prepare the surface and apply the paint to the exposed portion of the body panel, but also to do so at least partially underneath the leg portion 30 of the gasket 26 to give a more professional finish similar to the original factory paint. As detailed in the Background section of this application, it is known to insert a cord or similar elongate element under the leg portion 30 and on top of the body panel 28 as far underneath as possible. Such an element effectively holds the edge 32 of the leg portion 30 away from the body panel 28 so that paint is applied underneath of a portion of the gasket leg 30. However, a separate masking must be applied to cover the gasket 26 itself to prevent it from being painted. An additional problem with the use of such elements is that the paint tends to build up along the element which leaves a paint ridge after the element is removed. Such paint ridges have proven to be susceptible to cracking and chipping.

Figure 4:
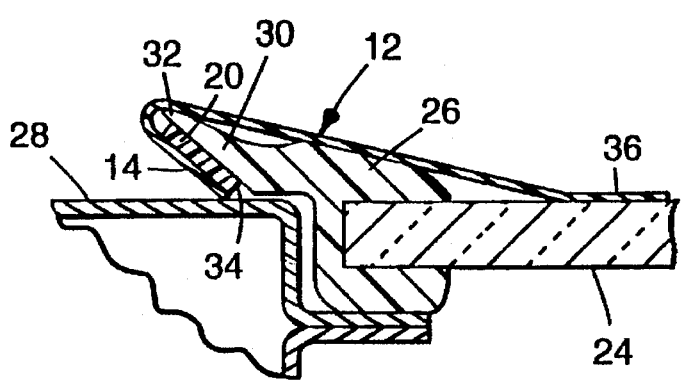
FIG. 4 is a cross-sectional view similar to FIG. 3 showing the masking tape of the present invention applied to the gasket for lifting the gasket edge and masking the gasket.

The present invention overcomes these drawbacks by effectively lifting and holding the gasket leg 30 from the body panel 28 while at the same time masking the gasket 26 itself, as shown in FIG. 4. To accomplish this, a stiffened edge 34 of the masking tape 10 is inserted under the edge 32 of the gasket leg 30 and preferably as far underneath as it can go. Moreover, the stiffened edge 34 of the masking tape 10 is inserted under the gasket leg 30 along the entire length of the gasket 26 that is adjacent to the area of the body panel 28 that is to be refinished. Since the masking tape 10 is flexible, the tape can follow most curves in the gasket 26. If the curve is severe, it may be necessary to also provide transverse cuts partially through the tape 10 within the stiffened non-adhesive portion 14 or preferably through the adhesive portion 12 at the curve. In any case, although it is only necessary that the stiffened edge 34 and a portion of the stiffening strip 20 be inserted, preferably the entire stiffening strip 20 is inserted under the gasket leg 30.

After the non-adhesive portion 14 of the masking tape 10 is inserted under the gasket leg 30 for the necessary length, the next step is to secure the adhesive portion 12 of the masking tape 10 to the gasket 26 and the adjacent window 24. At the same time, it is also a function of the tape structure of the present invention to lift and hold the gasket leg 30 from the body panel 28 so as to refinish at least partially underneath the gasket leg 30. Moreover, it is a purpose of the present invention to do so while minimizing the formation of any paint ridge after the masking tape 10 is removed.

To lift the gasket leg 30, the person applying the masking tape 10 pulls from the opposite edge 36 of the masking tape 10 and then adheres the adhesive portion 12 to the gasket 26 and window 24. In order for this lifting to occur, it is important that the non-adhesive portion 14 be sufficiently stiffened by the stiffening strip 20 so that the stiffened edge 34 acts against the body panel 28 in a lever-type action to lift the edge 32 of the gasket leg 30. According to the embodiment illustrated in FIGS. 1 and 2, it is the combination of the stiffening strip 20 and the edge portion of the backing layer 16 that must be stiff enough so that the stiffening strip 20 maintains its structural integrity during the lifting operation. That is, the stiffening strip 20 remains substantially linear as viewed in transverse cross-section, see FIG. 4, although it may curve somewhat and still maintain its function.

Moreover, the non-stiffened portion, the adhesive portion 12, must be sufficiently flexible to go around the gasket edge 32 and over the gasket 26 and to the window 24. The degree of stiffness of the non-adhesive portion 14 and the degree of flexibility of the adhesive portion 12 depend on the flexibility of the material making up the gasket 26. Specific values for the stiffness of certain materials usable for the stiffening strip 20 as used on conventional gasket materials are set out below in Table 1. It is the specific combination of the stiffened region comprising the non-adhesive portion 14 with a sufficiently flexible adhesive portion 12 that provides the lever action which lifts and holds the gasket leg 30 off of the body panel 28. The tape structure acts in the way of a hook without having to actually form and maintain a rigid hook structure in the tape.

It is also an advantage of the present invention that the stiffened edge 34 minimizes the formation of a paint ridge. As shown in FIG. 4, the formation of a ridge is minimized because the non-adhesive portion 14 converges with the body panel 28 toward the stiffened edge 34. A cord, by comparison, exhibits a more vertical and even somewhat diverging surfaces which are much more likely to form a paint ridge. Moreover, the stiffened edge 34 acts as a feathering edge. Any slight irregularities along the stiffened edge, which may have been formed during tape edge slicing, advantageously permit some sprayed paint to pass underneath the stiffened edge 34. The result is a leathered or blended edge. It is further contemplated to specifically modify the stiffened edge 34 by a manufacturing step to provide a shaped edge, regular or not, which permits passage of paint thereunder, e.g. a scalloped or notched edge. Many modifications are possible so long as the transverse structural rigidity of the non-adhesive portion 14 is maintained.

Suitable tape backings include, for example, extensible paper, PVC, polypropylene, polyethylene, copolymers of polyethylene and polypropylene, or any other polymer backing that is flexible enough to wrap around the region that is to be masked. Any suitable adhesive may be used for purposes of the present invention, including for example, natural rubber-based adhesives, styrene-butadiene rubber (SBR)-based adhesives, acrylate adhesives, cross-linkable hot melt Kraton-type adhesives, or any blends thereof. Preferably, the adhesive used should not transfer to the masked region. In the case of use on conventional gasket materials, such as EPDM, natural rubber adhesives or blends of natural rubber and synthetic rubber adhesives are preferred that have an adjusted cross-link density to provide a balance between compliance and clean removal.

Suitable materials for the stiffening edge will vary with the desired application.

Possible applications include, for example, masking baseboards, or other rigid construction parts wherein the non-adhesive portion 14 would be inserted between the wall or panel and baseboard and the tape would be wrapped over and adhered to the baseboard. The tape could similarly be used for masking rigid auto body side moldings, hoods, fenders, or other parts wherein the non-adhesive portion 14 of the tape is inserted between the part to be painted and the part to be masked and wrapped over and adhered to the part to be masked. The usable materials and stiffness requirements will vary with the particular application and the thickness of the gap between the part to be painted and the part to be masked. As above and more generally, the present invention may be used for masking flexible or semi-rigid objects or objects resiliently mounted wherein it is desired to lift and hold the object away from the panel or wall to be refinished to allow at least partial refinishing underneath of the masked object. Such uses include, for example, lifting and holding carpeting away from a floor, wall or baseboard region that is to be refinished, or lifting and holding a gasket, away from an auto body panel that is to be refinished as fully described above. For these applications, the non-adhesive portion 14 of the tape must be thin enough to allow insertion under the object to be masked, yet of sufficient stiffness to be able to lift and hold an edge of the object away from the area to be refinished.

In accordance with the use of the subject masking tape 10 for lifting and holding known gasket constructions, the stiffening strip 20 may comprise any material that has an adequate stiffness to lift the gasket leg. Suitable materials that may be used for the stiffening strip 20 include paper, plastic, metal, etc. Preferred plastic materials include, for example, polystyrene, polypropylene, polyethylene, PVC, PETG, polyester, polycarbonate, and blends or copolymers thereof, preferably at a thickness of about 10 mil (254 µm). Taber stiffness values were measured for several of these materials using a Teledyne Taber Tester Model 150-D (available from Testing Machines, Inc., Amityville, N.Y.) according to TAPPI official test method T 489 cm-86, Stiffness of Paper and Paperboard. The stiffness values were measured in gram-centimeters, and are summarized in Table 1. The values reported represent the average of five replicate measurements.

TABLE 1

Stiffness Values of Edge-Reinforcement Materials

| Material | Caliper | | Taber Stiffness Value | |
|---|---|---|---|---|
| | (mil) | (µm) | (g-cm) | (nM-m) |
| polystyrene | 12 | 3048 | 36 | 3.5 |
| polycarbonate | 27 | 6858 | 375 | 36.8 |
| PETG | 15 | 3810 | 62 | 6.1 |
| polyester | 4.6 | 1168 | 4 | 0.4 |
| polyester | 6.8 | 1727 | 13 | 1.3 |
| card stock | 18.2 | 4623 | 65* | 6.4 |
| creped paper tape | 6.2 | 1575 | 4* | 0.4 |
| flatback paper tape | 14.7 | 3734 | 261* | 25.6 |

*Note for paper materials, the measured stiffness value is dependent on paper fiber orientation, i.e., machine direction verses cross direction of the paper.

The materials set out in Table 1 above that were tested for stiffness were also tested for suitability for the application of lifting and holding a gasket leg of a window gasket composed of EPDM. Initially, it was determined whether or not the material was sufficiently stiff to be inserted under such a gasket leg, and then secondly, whether it was sufficiently stiff to provide the desired lever action for lifting and holding the gasket leg from the body panel.

The creped paper tape and the two polyester samples were not stiff enough for insertion under the gasket materials tried. The 12 mil (3048 µm) polystyrene stiffening strip worked well, and from this data it appears that a preferred reinforcing strip should have a Taber stiffness value of at least 20 to be acceptable for this particular application. Again, the acceptable stiffness limit depends on the construction of and material of the gasket, however, and a reinforced edge that is not stiff enough for insertion under a relatively rigid PVC gasket may work well for insertion under a more flexible EPDM gasket.

Furthermore, the backing layer material should be significantly more flexible than the material of the stiffening strip 20. Such permits the backing layer 16 to be wrapped around the edge of the gasket or other object without adversely affecting the function of the stiffening strip. Moreover, the combination provides a hinge function without having to actually form one. If the entire width of the tape were of the same stiffness, a hinge line would be required to cause the lever action. It is also understood that the same material could be used for both the stiffened and non-stiffened portions provided the thicknesses are varied accordingly. Preferably, the backing layer material is also stretchable by a significant amount, so that during application, the masking tape can be stretched in the transverse direction of the masking tape.

A preferred construction for a masking tape suitable for masking a gasket and for lifting and holding a gasket leg portion thereof, as described above, is as shown in FIGS. 1 and 2 and comprises a 2 inch (5.08 cm) 4 mil (102 µm) PVC backing coated with a phenolic crosslinked natural rubber adhesive applied at 6.3 grains/24 square inch (26 grams/ square meter). The stiffening strip preferably comprises a ⅜ inch (0.95 cm) 15 mil (381 µm) PETG copolymer film (a glycerol modified polyethylene terephthalate). A commercially available 6.4 mil (162 µm) release liner comprising a paper coated on one side with polypropylene and on the other side with polyethylene, with a silicone LAB on the polyethylene coated surface is also preferably provided. Such a release liner is commercially available from PWA Kunstoff, GMBH of Raubling, Germany.

Figure 5:
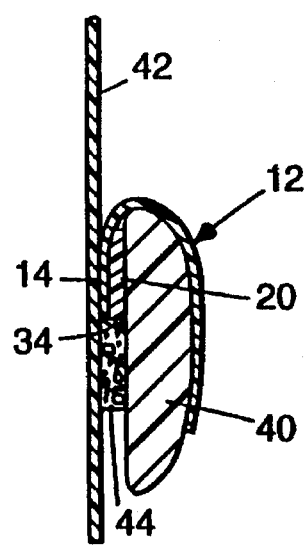
FIG. 5 is a cross-sectional view of a body panel and body-side molding with the masking tape of the present invention applied thereto.

Referring now to FIG. 5, the application of the subject masking tape 10 to a body side molding 40 will be described. The body side molding is shown conventionally fastened to a body panel 42. Typically, such fastening may include a strip of foam tape such as shown at 44. Gaps are formed between the molding 40 and the body panel 42 above and below the fastener tape 44 which can be used for insertion of the non-adhesive portion 14 of the subject masking tape 10. Thereafter, the liner 22 is removed, if so provided, and the adhesive portion 12 is wrapped around and adhered to the molding 40. As in the above-described application, the stiffening strip 20 provides the dual purpose of facilitating the insertion of the non-adhesive portion 14 between the molding 40 and the body panel 42 and tends to lift the edge of the molding 40 from the body panel 42. Any amount of lift depends on the degree of deformation of the body molding 40 or of the fastening means, such as permitted by flexing of the foam tape 44. If the areas on both sides of the molding 40 are to be refinished, then a similar strip of masking tape 10 is applied in the same way between the lower gap of the molding 40 and body panel 42.

From this description, it can be easily envisioned how the subject masking tape 10 can be applied in innumerable situations. As long as there is a gap for insertion of the non-adhesive portion 14, the stiffened strip 20 facilitates insertion thereof into that gap and tends to widen or open the gap by the lever action of the stiffening strip 20 against the panel or wall. Of course this tendency is limited by the resiliency of the object itself and the means that the object being masked is fastened to the panel or wall. There must, however, be an existing gap or the object must be sufficiently flexible to permit such insertion.

In the situation where a definite gap is provided, but the mounting of the object to the panel or wall is very rigid, the stiffness of the non-adhesive portion 14 is less critical. In fact, a simple longitudinal non-adhesive portion of the flexible backing layer 16 may be sufficient.

Figure 6:
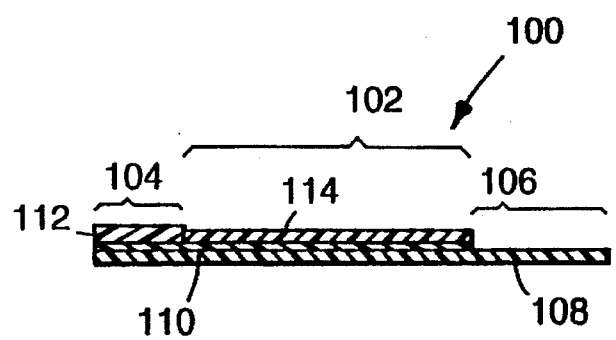
FIG. 6 is a cross-sectional view of another embodiment of a masking tape structure in accordance with the present invention.

A dual purpose masking tape 100 is illustrated in FIG. 6 comprising a longitudinal adhesive portion 102, a longitudinal stiffened non-adhesive portion 104 and a longitudinal non-stiffened, non-adhesive portion 106. A backing layer 108 is provided to make up the entire transverse width of the masking tape 100. An adhesive layer 110 is zone coated over a major surface of the backing layer 108 except for the non-stiffened, non-adhesive portion 106. A stiffening strip 112 is adhered to the backing layer 108 within the stiffened non-adhesive portion 104 for rendering that portion non-adhesive.

Alternatively, the entire surface of the backing layer 108 may be coated with an adhesive layer 110, and the non-adhesive portion 106 may have a second stiffening strip adhered thereto which is of a different caliper that the first stiffening strip 112. In this case, portion 106 would actually be a stiffened portion.

A protective liner 114 is also preferably provided for such a tape in roll form for the same reasons as discussed above in the earlier embodiment.

This masking tape 100 provides a masking tape that can perform all of the applications noted above with regard to the masking tape 10 embodiment. Additionally, the masking tape 100 has applicability in those situations discussed just above where a definite gap is provided but the mounting of the object is too rigid for insertion of the thicker stiffened non-adhesive portion 104. Specifically, the non-adhesive portion 106 could be used in such situation. The presence of either non-adhesive portion 104 or 106 while the other one is being used does not take away from the function of the masking tape so long as the adhesive portion 102 is designed for the use as set forth above. In fact the non-used non-adhesive portion 104 or 106 can be advantageously used to facilitate removal of the masking tape from the masked surface after the refinishing operation is complete.

It is apparent that many other modifications may be made to the subject masking tape in accordance with the present invention. Moreover, it is apparent that many other applications for the subject masking tape are possible.

We claim:

1. An elongate masking tape structure for use in masking flexible gaskets while mounted in place relative to a panel to be refinished, the gasket being of the type including a free leg portion that overlaps the panel, said masking tape structure being divided along a major surface thereof into a first longitudinal zone, a second longitudinal zone, and a third longitudinal zone provided on the opposite edge of the first longitudinal zone than the second longitudinal zone, and comprising:

a backing layer;

an adhesive layer covering at least a portion said backing layer within said first longitudinal zone wherein a non-adhesive portion of said backing layer comprises said third longitudinal zone; and stiffening means for making said second longitudinal zone stiffer in the transverse direction thereof than said first longitudinal zone in the transverse direction thereof, said stiffening means comprising a strip connected with said backing layer, wherein said first zone is flexible for wrapping about a gasket to which said masking tape is to be applied and said second zone is sufficiently stiff in the transverse direction thereof so that said strip remains generally linear in its transverse direction so as to create a lever action against a free leg gasket portion when the second zone is inserted under the free leg gasket portion and when a force is applied in the transverse direction of the masking tape from the first zone.

2. The masking tape structure of claim 1, wherein said strip of said stiffening means comprises a layer of material that is stiffer than said backing layer which covers at least a portion of said backing layer.

3. The masking tape structure of claim 2, wherein the material of the layer of said stiffening means has a Taber stiffness value of at least 20 g-cm in the transverse direction of said masking tape.

4. The masking tape structure of claim 3, wherein said backing layer comprises a polymeric material.

5. The masking tape structure of claim 4, wherein said polymeric material of said backing layer is stretchable by a significant amount.

6. The masking tape structure of claim 4, wherein said material of the layer of said stiffening means comprises a different polymeric material than that of said backing layer.

7. The masking tape structure of claim 1, wherein said strip comprises a portion of said backing layer folded upon said backing layer.

8. The masking tape structure of claim 1, further including a protective liner covering said first longitudinal zone and adhered to said adhesive layer.

9. The masking tape structure of claim 1, wherein said adhesive layer covers said first longitudinal zone.

10. The masking tape structure of claim 1, wherein a second stiffening strip of a different caliper than said strip of said second longitudinal zone comprises said third longitudinal zone.

* * * * *